United States Patent [19]

Bartoszek et al.

[11] Patent Number: 4,585,701
[45] Date of Patent: Apr. 29, 1986

[54] COMPOSITES OF POLYVINYLIDENE FLUORIDE ALLOYS AND THERMOPLASTIC POLYMERS AND THEIR PREPARATION

[75] Inventors: Edward J. Bartoszek, Jeffersonville, Pa.; Steven F. Mones, Newark, Del.

[73] Assignee: Pennwalt Corporation, Philadelphia, Pa.

[21] Appl. No.: 580,483

[22] Filed: Feb. 15, 1984

[51] Int. Cl.[4] ............................................. B32B 27/08
[52] U.S. Cl. ..................................... 428/421; 264/37; 264/171; 264/176 R; 428/424.2; 428/424.6; 428/424.8
[58] Field of Search .................. 428/421, 424.6, 424.2, 428/424.8; 525/199; 264/171, 176 R, 37; 156/322, 244.18

[56] References Cited

U.S. PATENT DOCUMENTS

| | | | |
|---|---|---|---|
| 3,253,060 | 5/1966 | Koblitz et al. | 525/199 |
| 3,448,183 | 6/1969 | Chisholm | 264/37 |
| 3,459,834 | 8/1969 | Schmitt | 525/199 |
| 3,524,906 | 8/1970 | Schmitt et al. | 525/199 |
| 3,968,196 | 7/1976 | Wiley | 264/171 |
| 4,051,293 | 9/1977 | Wiley | 428/421 X |
| 4,215,177 | 7/1980 | Strassel | 428/424.6 X |
| 4,221,757 | 9/1980 | Strassel | 264/171 |
| 4,226,904 | 10/1980 | Ollivier et al. | 156/322 X |
| 4,289,560 | 9/1981 | Simons | 156/244.18 |
| 4,291,099 | 9/1981 | Strassel | 428/421 |
| 4,317,860 | 3/1982 | Strassel | 428/421 |
| 4,317,861 | 3/1982 | Kidoh et al. | 428/421 |

FOREIGN PATENT DOCUMENTS 0060421 9/1982 European Pat. Off. ............ 264/171

OTHER PUBLICATIONS

Pennwalt Technical Data Sheet, "KYNAR ®/Acrylic Alloys RC-9637 and RC-9638", 7/22/80.

Primary Examiner—Thomas J. Herbert

[57] ABSTRACT

Composites of polyvinylidene fluoride alloys, and incompatible thermoplastic polymers are prepared by two-layer coextrusion with recycling of scrap material.

11 Claims, 2 Drawing Figures

COMPOSITES OF POLYVINYLIDENE FLUORIDE ALLOYS AND THERMOPLASTIC POLYMERS AND THEIR PREPARATION

BACKGROUND OF THE INVENTION

This invention relates generally to composite constructions of dissimilar polymers and more specifically to composites of polyvinylidene fluoride/polymethyl methacrylate alloy compositions with dissimilar thermoplastic polymers and to the method of making such constructions by two-layer coextrusion with recycling of scrap material produced in the process.

Polyvinylidene fluoride resin (PVDF) is a high-performance member of the fluorocarbon polymer class, combining excellent resistance to chemicals and weathering with ease of processing. It is, in many ways, a bridge between low-cost, general purpose polymers and higher-cost, ultra-high performance fluoropolymers. One of the outstanding physical properties of PVDF is its resistance to severe outdoor weathering conditions, which include ultraviolet radiation and harsh extremes of temperature and humidity. These properties make PVDF an attractive prospect as a protective cap stock material when laminated to less durable polymers, such as acrylonitrile-butadiene-styrene (ABS) and polyvinylchloride (PVC). A convenient method of forming such composites or laminates is by coextrusion. Although coextrusion processes involving dissimilar polymers to form composites are well-known, many are feasible only if an adhesive layer is employed to make a bond possible between incompatible materials. Generally, coextrusion without an adhesive layer is possible only with polymers possessing a high degree of compatibility, such as within a family or class of polymers. When dealing with the relatively inert fluoropolymers, such as PVDF, the obtaining of satisfactory adhesion between layers in a two-layer coextrusion process has been extremely difficult. One such process for forming laminates of PVDF and polyurethanes is disclosed in U.S. Pat. No. 4,221,757. The PVDF is selected to have certain viscosity properties in order to obtain adhesion. Another such process for forming laminates is disclosed in U.S. Pat. No. 3,968,196 where PVDF is laminated to polystyrene by the control of viscosity properties. In any such coextrusion process, scrap material is produced, for example, due to edge trimming of the product and during start-up when the correct processing conditions are being established to produce product which meets specifications. This scrap represents a loss because it cannot be recycled to the process by incorporation into the base resin due to the incompatibility of PVDF with the base resin which causes a deterioration in the properties of the composite. We have now found that composites of PVDF alloys with other thermoplastic polymers including acrylonitrile-butadiene-styrene terpolymer (ABS), polycarbonate (PC), PC/ABS alloys, polyvinylchloride, methylmethacrylate-acrylonitrile-butadiene-styrene (MABS), and other acrylic polymers can be prepared without need for an adhesive layer or the requirement for matching of viscosity properties, with the ability to recycle scrap composite material to the process.

BRIEF SUMMARY OF THE INVENTION

In accordance with this invention, there is provided a process for making a polymer composite comprising conveying in a conduit a first heat-plasticized stream which comprises a mixture of a thermoplastic polymer which is incompatible with polyvinylidene fluoride and previously formed composite material, joining to the surface of the first heat-plasticized stream within the conduit a second heat-plasticized stream comprising an alloy of polyvinylidene fluoride and an acrylate polymer, thereby forming a single stratified stream of heat plasticized material conforming to the cross-section of the conduit, conveying the stratified stream to an extrusion die, passing the stratified stream of heat-plasticized material through the die, and cooling the stratified stream emerging from the die to form a solid polymer composite.

Also provided is a polymer composite comprising a protective layer comprising an alloy of polyvinylidene fluoride and an acrylate polymer which is directly bound to a substrate comprising a homogeneous mixture of a thermoplastic polymer which is incompatible with polyvinylidene fluoride, and polyvinylidene fluoride-acrylate polymer-thermoplastic polymer composite material.

DETAILED DESCRIPTION

Figure 1:
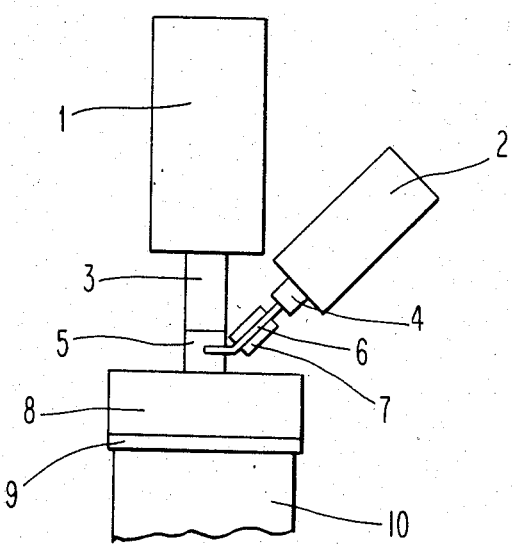
FIG. 1 schematically represents an apparatus for carrying out the process and preparing the composites of the invention by two-layer coextrusion.

As with other fluoroplastics, PVDF is relatively inert to most common materials which presents an adhesion problem when attempting to form composites to PVDF and other materials. It is possible, however, to incorporate into the PVDF a substance which will facilitate adhesion without sacrificing its excellent physical and chemical properties. Acrylate polymers such as polymethylmethacrylate (PMMA) are such materials and are compatible with PVDF over the entire range of compositions. Alloys of the two behave as homogeneous materials. Alloys of PMMA and PVDF are described, for example, in U.S. Pat. No. 3,253,060.

In the process of the invention, useful acrylate polymers include homopolymers and copolymers of lower alkyl (methyl, ethyl, propyl, butyl) methacrylates including copolymers with minor portions of other acrylates and/or ethylenically unsaturated monomers, for example, styrene, alpha-methyl styrene, and acrylonitrile. In the present invention, we have found that alloys of PVDF containing from about 20 to 50% by weight of the acrylate polymers provide excellent adhesion to incompatible polymer substrates and still retain a significant share of the PVDF polymer properties. By adjusting the PVDF/acrylate ratio to from about 50/50 to 80/20 (by weight) and preferably from about 60/40 to 70/30, an optimum balance of physical properties and chemical resistance for any given application can be achieved. Although PVDF homopolymers are preferred, vinylidene fluoride copolymers containing minor amounts, e.g., up to about 30% by weight, of other ethylenically unsaturated monomers such as tetrafluoroethylene, chlorotrifluoroethylene, hexafluoropropylene, ethylene and the like, can also be used and such copolymers and included in the term polyvinylidene fluoride as used herein. The alloy not only provides for direct adhesion of the two polymer layers but also permits the grinding or cutting and recycling of scrap composite polymer material to the thermoplastic polymer substrate layer. The presence of the acrylate polymer provides sufficient compatibility between the thermoplastic polymer and the PVDF to avoid significant deterioration of the properties of the thermoplastic polymer substrate layer. The scrap composite material can be derived from either the current or a previous extrusion process.

For economic reasons, it is recommended that the PVDF alloy layer be kept as thin as possible, although this is not a performance necessity and layer thicknesses of up to 0.015 inch or more can be used with preferred thicknesses being from about 0.002 to 0.004 inch. Two approaches can be used in order to make a thin PVDF alloy layer suitable as a cap stock material for ultraviolet sensitive polymer substrates. First, an ultraviolet absorbing compound can be blended into the PVDF alloy prior to its coextrusion. Nonpolymeric benzophenones are compatible with PVDF and PVDF alloys and their inclusion results in optically transparent blends with the excellent durability inherent in the PVDF alloy. Depending upon the amount of ultraviolet absorbing compound used, protective cap stock of as thin as 0.001 inch is useful. The second method is to pigment the PVDF alloy prior to coextrusion. Many inorganic pigments are good at screening ultraviolet radiation and this approach leads, naturally, to an opaque cap stock which may be desirable for aesthetic reasons or color identifications. This method is also more economical since pigments generally are less expensive than ultraviolet absorbing compounds.

The thermoplastic polymers used for the substrate layer can be any polymer either having some acrylic character or being compatible with acrylics. Examples of these polymers include, for example, acrylonitrile-butadiene-styrene (ABS), polycarbonate (PC), PC/ABS alloys, polyvinylidene chloride (PVC), and methyl methacrylate-acrylonitrile-butadiene-styrene (MABS).

The substrate polymer layers can include minor amounts of conventional additives such as plasticizers, antioxidants, fillers, and pigments. The thickness of the substrate layer generally ranges from about 0.010 to about 0.100 inch.

An important factor in a coextrusion process regardless of the polymer materials involved is melt rheology. In order to obtain even layers of uniform thickness, the melt viscosities of the PVDF-acrylate alloy and the substrate polymer should be fairly close. An exact match is not necessary, and in the case of polycarbonates is not possible, but the closer the materials' melt viscosities, the greater is the probability of obtaining good-quality extrudate.

There are various ways of matching the melt viscosities of the materials to be coextruded. Many thermoplastic polymers are available in a range of melt viscosities to suit different operations and conditions. A second method, is to adjust the temperatures of the extruders to compensate for a differential in melt viscosities. The two melt streams are in contact for only a short time before leaving the die so they can be run at temperatures somewhat independent of one another. A third method is to blend fillers into the substrate polymer. This approach is highly dependent on the material and the final application, however, so that the first two methods are more practical and are applicable in most cases.

The bringing together and adhering of the PVDF alloy and the incompatible thermoplastic polymer is achieved by using a coextrusion process. Coextrusion is a well known technique and can be accomplished, for example, by using either a multimanifold coextrusion die or the coextrusion feedblock approach. FIG. 1 illustrates apparatus which employs the feedblock technique, where the individual melt streams come into contact before entering the die, which may be preferable because the materials are in contact for a longer time. In a normal two extruder process, the cap stock material, in this case the PVDF alloy, can be run in the smaller satellite extruder 2 (if the two extruders are of different sizes). The cap stock material is melted in the extruder barrel and pumped through satellite adaptor section 4 and adaptor tube 6, which is heated by heater block 7, into the coextrusion feedblock 5. Here the cap stock material stream contacts the melt stream of the substrate polymer which is being fed from the main extruder 1 through main adaptor section 3. Due to the condition of laminar flow, no intermixing of the two melt streams occurs which results in two discreet layers of material in intimate contact. The stratified, combined melt stream then enters the processing die 8 where the form of the final composite product 10 which exits from die lips 9 is established.

Figure 2:
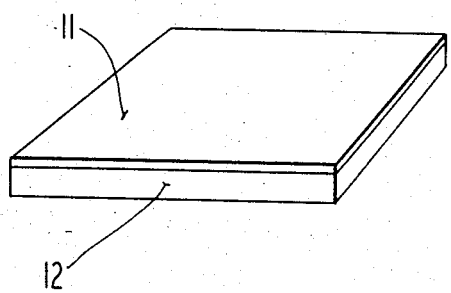
FIG. 2 is a perspective view of a two-layer composite according to the invention.

Composite product 10, as illustrated in FIG. 2, comprises a top protective coat layer 11 of PVDF alloy in direct contact with and bound to polymer substrate layer 12. The shape of the composite can be all of the usual possibilities for thermoplastics, e.g. flat film, blown film, tubing, pipe, profiles, sheaths or shapes. The interlaminar adhesion between the PVDF alloy and the other polymer is sufficient to withstand the forming stresses of the extrusion process and also any post-process forming, such as vacuum thermoforming. Multilayer composites can be produced, such as a substrate coated on each side by a protective cap coat of PVDF alloy using a suitable feedblock and die as is known in the art.

The advantage of the coextrusion process of the invention in producing thermally adhered composites is our finding that scrap or off-spec coextrudate can be reused without significant impact on the properties of the composite product. The scrap composite material is ground or cut into small pieces (0.050 to 0.250 inch for example) using a metered feeder to facilitate feeding the scrap to the extruder where it is blended in percentages of from about 0.1 to about 50 percent by weight with the virgin thermoplastic polymer. The potential for the reuse of scrap is dependent to some extent on the particular substrate material, which must have sufficient ability to withstand the mixing and extra heat history involved with re-extrusion without significant deterioration in properties.

The invention is futher illustrated by, but is not intended to be limited to, the following examples wherein percents are percents by weight unless otherwise indicated.

EXAMPLE 1A

The coextrusion equipment used was as illustrated in FIG. 1 and consisted of a 2 inch main extruder with a 24:1 L/D, 5:1 compression ratio screw and a 1.25 inch satellite extruder with a 24:1 L/D, 3.5:1 compression ratio screw. The PVDF alloy consisted of 60% by weight PVDF, 40% by weight PMMA, and 2.5% by weight (based on PVDF/PMMA) of Cyasorb UV-531, an ultraviolet absorbing compound marketed by American Cyanamid. The alloy had a melt viscosity of 18,200 poise as measured on a capillary rheometer at a temperature of 450° F. and a shear rate of 100 sec$^{-1}$. The thermoplastic polymer substrate was an ABS polymer which had a melt viscosity of 16,000 poise under similar conditions.

The alloy was extruded with the 1.25 inch extruder. The extruder's temperature profile ranged from 350° F. in the feed zone to 400° F. in the metering zone. The adaptor sections were maintained at 400° F. The 2 inch extruder, used for the ABS, had a temperature profile of 350° F. at the feed zone to 400° F. at the metering zone. The adaptors and coextrusion feedblock were kept at 400° F., the flat film die body at 405° F., and the die lips at 425° F. By adjusting the speeds of the individual extruders the layer thicknesses were controlled, and in this case were established at 0.015 inches ABS and 0.003 inches of PVDF/PMMA. No intermixing of the layers were observed; the polymer composite had a distinct interface with excellent interlaminar adhesion and no separation of the layers occurred under any test conditions which included boiling water, immersion tests and vacuum thermoforming.

EXAMPLE 1B

The 2 inch extruder with a 24:1 L/D, 5:1 compression ratio screw was used to re-extrude chopped-up scrap material from Example 1A. The 100% by weight reground material was processed under the following conditions: temperature profile ranged from 350° F. at the feed section to 400° F. at the metering section, the adaptors were at 400° F., the die body at 405° F., and the die lips at 425° F.

The chopped-up scrap material extruded well with no problems. An alloy resulted which displayed the physical properties of a homogeneous material, not individual components. Table I below compares the tensile and elongation properties of the original coextruded sheet from Example 1A and the re-extruded sheet from Example 1B.

TABLE I

|  | Yield Tensile (psi) | Break Tensile (psi) | Elongation (%) |
|---|---|---|---|
| Coextruded(PVDF/PMMA)/ABS | 5640 | 4850 | 64 |
| Re-extruded[(PVDF/PMMA)/ABS] | 6010 | 5100 | 37 |

NOTES:
1. Tested according to ASTM D882
2. Measurements made in Machine Direction
3. Test Conditions: Grip Speed = 2 in./min. Sample Thickness = 0.013–0.018 in. Sample Length = 2.000 in. Temperature = 70° F. (Room Temp.)

The tensile properties and elongation of the re-extruded material are comparable to the original coextruded sheet indicating that composite scrap material could be mixed with the substrate material without causing a loss of strength and flexibility.

EXAMPLE 1C

The equipment used was the same as described in Example 1A. The PVDF/PMMA alloy and its processing conditions were also the same. The substrate consisted of 90% by weight virgin ABS blended with 10% by weight reground coextruded composite scrap (PVDF/PMMA/ABS). The blended material was processed the same as the virgin ABS in Example 1A.

The resulting coextruded composite sheet showed good uniformity and excellent interlaminar adhesion. No processing problems were encountered and the blended virgin/reground substrate material processed comparable to 100% virgin material.

EXAMPLE 2

The equipment and the PVDF/PMMA alloy used were the same as described for Example 1A. A PC/ABS alloy, BAYBLEND MC-2500 from Mobay Chemical Company, was extruded in the 2 inch extruder. The PC/ABS had a melt viscosity of 19,000 poise which is very close to that of the PVDF/PMMA (18,200 poise, as measured on a capillary rheometer at 450° F., 100 sec$^{-1}$). The PVDF/PMMA was processed at 375° F. at the feed section to 425° F. at the metering zone. The adaptor sections ranged from 425° F. to 475° F. The PC/ABS was processed at 400° F. in the feed zone 450° F. in the metering zone. The coextrusion adaptor, die body, and die lips were maintained at 475° F.

The resulting coextruded sheet showed excellent interlaminar adhesion illustrating the ability of the PVDF/PMMA alloy to bond directly to the PC/ABS alloy substrate. The layer thicknesses were 0.012 inch PC/ABS and 0.003 inch PVDF/PMMA. The laminate appeared to be a homogeneous material which resisted delamination under boiling water immersion and the physical stress of vacuum thermoforming. The tensile test data was: yield 7900 psi; Break 7220 psi and % elongation 150.

EXAMPLE 3A

The equipment used was similar to that described in Example 1. The PVDF/PMMA alloy consisted of 60% by weight PVDF (KYNAR ®740 from Pennwalt Corporation), 40% by weight PMMA (PLEXIGLAS VS-100 from Rohm & Haas), and a mixture of two pigments, Shepherd Brown 12-3% by weight and Shepherd Black 1D-4% by weight, both based on PVDF/PMMA. An extrusion grade PVC from Alsco Anaconda was used. The PVC was extruded in the 2 inch extruder with a 24:1 L/D, 3.5:1 compression ratio, deep-flighted screw with a gradually tapering profile in order to minimize shear heating. The temperatures were 320° F. in the feed zone, gradually increasing to 400° F. at the die. The PVDF/PMMA alloy was extruded in the 1.25 inch extruder (24:1 L/D, 3.5:1 compression ratio screw) at temperatures ranging from 350° F. in the feed section to 400° F. in the adaptor section.

The resulting coextruded composite sheet showed excellent interlaminar adhesion and the material performed as an integral laminate. The total sheet thickness was 0.040 inches with a layer distribution of 0.038 inches PVC and 0.002 inches PVDF/PMMA. The tensile test data were: yield 5450 psi; break 6090 psi; and % Elongation 220. The composite did not delaminate either in boiling water or upon vacuum forming.

EXAMPLE 3B

In order to demonstrate the compatibility of film scrap with virgin PVC, samples of film scrap from the coextruded PVC and PVDF alloy composite prepared according to the process of Example 3A were mixed with PVC in proportions of 15/85% and 25/75% by weight scrap to PVC (3B-1 and 3B-2 respectively) on a two roll mill and tensile data was obtained. The tensile properties were compared with a PVC control and also with a sample made by mixing PVDF homopolymer (KYNAR 740) with PVC. The results are given in Table I.

TABLE I

| Sample | Composition | Yield Tensile (PSI) | Break Tensile (PSI) Plain | Elongation (%) |
|---|---|---|---|---|
| Control | 100% PVC | 6084 | 6448 | 154 |
| 3B-1 | 15% Film Scrap 85% PVC | 6095 | 6425 | 152 |
| 3B-2 | 25% Film Scrap 75% PVC | 6213 | 6429 | 148 |
| Comparision | 10% PVDF 90% PVC | No yield | 6128 | 39 |

Tensile Properties by Microtensile per ASTM D-1708
Grip Speed .5 in/min; Chart Speed 1 in/min.

The results listed on Table I demonstrate the film scrap containing the alloy, when mixed with PVC substrate material, gave a material having yield and tensile properties comparable to the Virgin PVC control. The sample which contained the PVDF homopolymer alone, on the other hand, was brittle as it had no yield tensile and a relatively low elongation before breaking.

The foregoing examples illustrate the ability to reuse scrap or off-spec extrudate to produce a polymer composite having good physical and adhesion properties. This is important because viability of a process depends not only on the quality of the end product, but on its cost. Any extrusion, molding, or forming process inevitably generates scrap. If PVDF alone is used as a cap coat, not only is the obtaining of sufficient adhesion without an adhesive coat difficult, but the scrap material is not compatible with certain substrate polymers and would have to be discarded to avoid an adverse effect of the properties on the overall composite.

We claim:

1. A polymer composite comprising a protective layer comprising an alloy of polyvinylidene fluoride and an acrylate polymer which layer is directly bound to a substrate comprising a homogeneous mixture of a thermoplastic polymer which is incompatible with polyvinylidene fluoride and scrap polymer composite material.

2. The composite of claim 1 wherein said protective layer includes a ultraviolet absorbing compound.

3. The composite of claim 1 wherein said protective layer includes a ultraviolet screening pigment.

4. A process for forming a polymer composite comprising conveying in a conduit a first heat-plasticized stream which comprises a mixture of a thermoplastic polymer which is incompatible with polyvinylidene fluoride and previously formed scrap composite material from said process, joining to the surface of the first heat-plasticized stream within said conduit a second heat-plasticized stream comprising an alloy of polyvinylidene fluoride and an acrylate polymer, thereby forming a single stratified stream of heat-plasticized material conforming to the cross-section of the conduit, conveying the stratified stream to an extrusion die, passing the stratified stream of heat-plasticized material through the die, and cooling the stratified stream emerging from the die to form a solid polymer composite wherein the layers of the composite are coextensive.

5. The process of claim 4 wherein said first stream contains from about 0.1 to about 50 percent by weight of scrap material.

6. The process of claim 4 wherein said thermoplastic polymer is polyvinylchloride.

7. The process of claim 4 wherein said thermoplastic polymer is polyacrylonitrile-butadiene-styrene.

8. The process of claim 4 wherein said alloy contains from about 20 to 50 percent by weight of acrylate polymer.

9. The process of claim 4 wherein said acrylate polymer is polymethylmethacrylate.

10. The process of claim 4 wherein said second stream includes an ultraviolet absorbing compound.

11. The process of claim 4 wherein said second stream includes a pigment which screens ultraviolet radiation.

* * * * *